(12) United States Patent  
Morgan et al.

(10) Patent No.: US 8,082,089 B2  
(45) Date of Patent: Dec. 20, 2011

(54) VEHICLE SPEED CONTROL IN A CRUISE MODE USING VEHICLE BRAKES

(75) Inventors: Peter J Morgan, San Antonio, TX (US); David William Minner, Pickney, MI (US)

(73) Assignee: GM Global Technology Operations LLC

( * ) Notice: Subject to any disclaimer, the term of this patent is extended or adjusted under 35 U.S.C. 154(b) by 405 days.

(21) Appl. No.: 12/394,805

(22) Filed: Feb. 27, 2009

(65) Prior Publication Data

US 2010/0023236 A1    Jan. 28, 2010

Related U.S. Application Data

(60) Provisional application No. 61/082,859, filed on Jul. 23, 2008.

(51) Int. Cl.  
*B62K 31/00* (2006.01)

(52) U.S. Cl. ............................. 701/94; 180/170; 701/70

(58) Field of Classification Search .................... 701/93, 701/94, 70; 180/170  
See application file for complete search history.

(56) References Cited

U.S. PATENT DOCUMENTS

| | | | |
|---|---|---|---|
| 4,809,183 A | 2/1989 | Eckert | |
| 5,707,117 A | 1/1998 | Hu et al. | |
| 6,283,240 B1 * | 9/2001 | Beever | 180/178 |
| 7,587,267 B2 * | 9/2009 | Mori et al. | 701/93 |
| 2010/0088001 A1 * | 4/2010 | Kato | 701/93 |

FOREIGN PATENT DOCUMENTS

| | | | |
|---|---|---|---|
| JP | 11301310 A | * | 11/1999 |
| WO | WO9903898 A | * | 4/1990 |
| WO | WO03041987 A | * | 5/2003 |
| WO | WO2007006659 A | * | 1/2007 |
| WO | WO2008094114 A | * | 8/2008 |
| WO | WO2010071498 A | * | 6/2010 |

* cited by examiner

*Primary Examiner* — Kevin Hurley

(57) ABSTRACT

A cruise control system includes a speed difference module that compares a current vehicle speed and a target cruise speed, and a brake module that selectively actuates a brake when the current vehicle speed is greater than the target cruise speed by a predetermined speed difference. A related method is also provided and includes comparing a current vehicle speed and a target cruise speed, and selectively actuating a brake when the current vehicle speed is greater than the target cruise speed by a predetermined speed difference. The method includes selectively actuating the brake based on a negative drive torque of a powerplant. The method also includes determining a desired braking force based on the current vehicle speed and the target cruise speed, and actuating the brake to generate an actual braking force less than or equal to the desired braking force.

10 Claims, 3 Drawing Sheets

VEHICLE SPEED CONTROL IN A CRUISE MODE USING VEHICLE BRAKES

CROSS-REFERENCE TO RELATED APPLICATIONS

This application claims the benefit of U.S. Provisional Application No. 61/082,859, filed on Jul. 23, 2008. The entire disclosure of the above application is incorporated herein by reference.

FIELD

The present disclosure relates to motor vehicles, and more particularly, to control systems and methods for vehicle speed control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powertrain that is comprised of a powerplant (e.g., an engine, an electric motor, and/or a combination thereof, a multispeed transmission, and a differential or final drive train. The powerplant produces drive torque that is transmitted through one of various gear ratios of the transmission to the final drive train to drive wheels of the vehicle.

Operation of the powertrain may be regulated by one or more control modules, such as a powertrain control module, based on driver inputs. More specifically, the powertrain control module may receive one or more signals from driver interface devices, such as an accelerator pedal, operated by the driver. Based on the signals it receives, the powertrain control module may regulate the operation of the powertrain to produce a desired drive torque. The powertrain control module may also regulate the operation of the powertrain to maintain a target cruise speed, such as when the vehicle is equipped with a cruise control system.

Vehicles equipped with a cruise control system typically include a cruise control switch that enables the driver to indicate the target cruise speed. In such systems, the driver may indicate the target cruise speed by actuating the switch while driving at the target cruise speed. In turn, the cruise control switch may generate a signal that, along with a wheel speed signal, may be used by the powertrain control module to determine the target cruise speed. The wheel speed signal may be generated using one or more wheel speed sensors that may be included with the vehicle.

In the cruise mode, the powertrain control module may regulate the powertrain to maintain an actual speed of the vehicle within a desired range of the target cruise speed. The actual speed of the vehicle depends on several factors, such as engine drive torque and road grade. Typically, the powertrain control module may regulate the powertrain to maintain the actual vehicle speed within the desired speed range by raising or lowering the drive torque produced by the engine. However, on a downhill grade, the actual speed of the vehicle may continue to increase without the assistance of the drive torque produced by the powertrain. Moreover, the actual speed of the vehicle may exceed an upper threshold speed of the desired speed range.

In this case, the powertrain control module may regulate the powertrain to produce negative drive torque that may be used to decelerate the vehicle and thereby bring the actual vehicle speed within the desired speed range. For example, the powertrain control module may regulate an engine included with the powerplant in a deceleration enleanment mode. In the deceleration enleanment mode, the powertrain control module may inhibit fuel to the engine and thereby cause the engine to generate negative drive torque.

Similarly, in a hybrid powerplant, control module may regulate an electric motor included with the hybrid powerplant in a regeneration mode. In the regeneration mode, rotational energy of the drivetrain generated by the moving vehicle is used to drive the electric motor. The powertrain control module may also regulate the powertrain in a powertrain braking mode. In the powertrain braking mode, the powertrain control module may regulate the transmission to shift into a lower gear, increasing the rotational speed of the powerplant, and thereby increasing the negative drive torque produced by the powerplant.

However, even when operating in one or more of the foregoing modes, the powertrain control module may be unable to inhibit the actual vehicle speed from exceeding the upper speed threshold of the desired speed range.

SUMMARY

Accordingly, the present disclosure provides an exemplary control system and method for maintaining vehicle speed within a desired speed range while operating in a cruise control mode. In one aspect, the present disclosure provides a cruise control system comprising a speed difference module that compares a current vehicle speed and a target cruise speed and a brake module that selectively actuates a brake when the current vehicle speed is greater than the target cruise speed by a predetermined speed difference. In one feature, the brake module actuates the brake while the current vehicle speed is greater than the target cruise speed. In another feature, the brake module selectively actuates the brake based on a negative drive torque of a powerplant.

In another aspect, the present disclosure provides a cruise control system comprising a speed difference module that determines a desired braking force based on a comparison of a current vehicle speed and a target cruise speed and a brake module that selectively actuates a brake to generate an actual braking force less than or equal to the desired braking force when the current vehicle speed is greater than the target cruise speed by a predetermined speed difference. In one feature, the speed difference module determines the desired braking force based on a negative drive torque of a powerplant. In another feature, the speed difference module determines the desired braking force using a control loop feedback routine.

In yet another aspect, the present disclosure provides a method for controlling vehicle speed in a cruise control mode. The method comprises comparing a current vehicle speed and a target cruise speed and selectively actuating a brake when the current vehicle speed is greater than the target cruise speed by a predetermined speed difference. In one feature, the selectively actuating the brake includes actuating the brake while the current vehicle speed is greater than the target cruise speed. In another feature, the selectively actuating the brake further includes selectively actuating the brake based on a negative drive torque of a powerplant.

In yet another feature, the method further comprises determining a desired braking force based on the comparing the current vehicle speed and the target cruise speed and actuating the brake to generate an actual braking force less than or equal to the desired braking force. In a related feature, the determining the desired braking force may further include determining the desired braking force based on a negative drive torque of a powerplant. In another related feature, the determining the desired braking force includes determining the desired braking force using a control loop feedback routine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
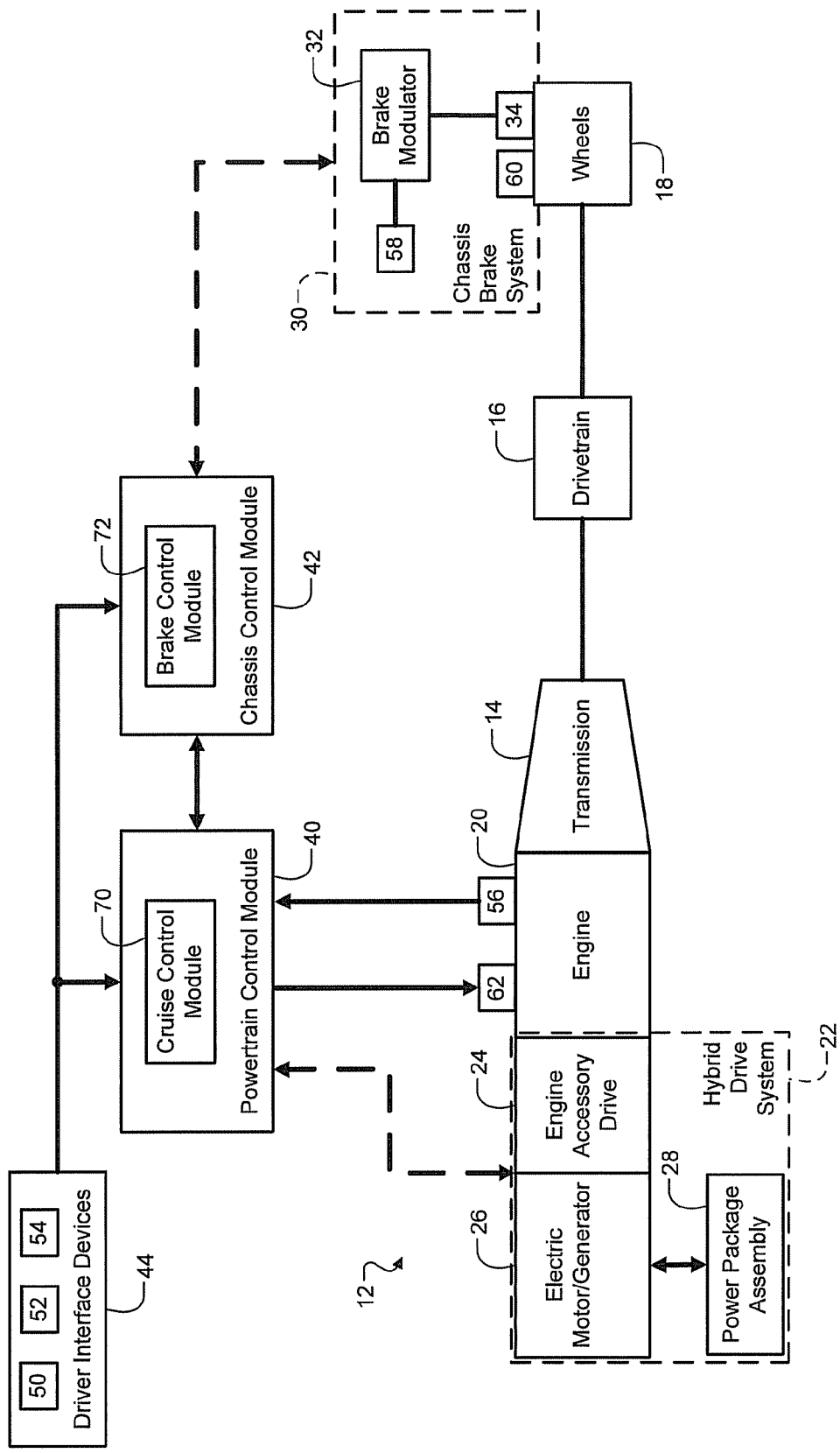
FIG. 1 is a functional block diagram illustrating an exemplary vehicle system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A vehicle travelling along surfaces, such as a roadway, may encounter a downhill grade. The downhill grade may cause the vehicle to gain speed. In a cruise mode, the downhill grade may cause vehicle speed to exceed a desired speed range. Accordingly, the present disclosure provides an exemplary control system and method for regulating the vehicle brakes in the cruise mode to maintain vehicle speed within the desired speed range. In this manner, the control system and method may be used to inhibit vehicle speed in the cruise mode while travelling on downhill grades.

With particular reference to FIG. 1, a functional block diagram illustrating an exemplary vehicle system 10 according to the principles of the present disclosure is shown. The vehicle system 10 includes a powerplant 12 that produces drive torque that may be used to accelerate the vehicle and maintain a desired vehicle speed. The drive torque may be transferred through a transmission 14 at varying gear ratios to a drivetrain 16 to drive at least one or more wheels 18 of the vehicle. The powerplant 12 may also be used to decelerate the vehicle by allowing the wheels 18 to back drive the powerplant 12 via the transmission 14 and drivetrain 16.

The powerplant 12 may be a hybrid powerplant that includes an internal combustion engine 20 and a hybrid drive system 22 as shown. The hybrid drive system 22 may be one of several types and may be a belt alternator starter system (BAS). Accordingly, the hybrid drive system 22 may include an engine accessory drive 24, an electric motor/generator 26, and a power package assembly 28. The engine accessory drive 24 is operable to transfer torque between the engine 20 and the electric motor/generator 26. In a motoring mode, the motor/generator 26 is operable to provide drive torque to the engine 20 while receiving electrical power from power package assembly 28. In a regenerating mode, the motor/generator 26 is operable to supply an electrical charge to power package assembly 28 while being driven by the engine 20. The power package assembly 28 includes a battery (not shown) for storing energy supplied by the motor/generator 26 and supplying the energy to the various components of the vehicle system 10, including the motor/generator 26.

The vehicle system 10 further includes a brake system 30 that may be used to generate a braking force to decelerate and thereby stop the vehicle. The brake system 30 is connected to the wheels 18 and is operable to selectively apply a desired brake torque to the wheels 18 and thereby slow the vehicle. The brake system 30 may include a brake modulator 32 connected to brakes 34 located at each of the wheels 18. The brake modulator 32 may be used to selectively apply the brakes 34 and thereby apportion the desired brake torque among the wheels 18 as may be desired. For example, the brake modulator 32 may apportion the desired brake torque between front and rear wheels of the vehicle. The brake modulator may also apportion the desired brake torque among the individual wheels 18 of the vehicle.

Operation of the vehicle system 10, including the powerplant 12, transmission 14, and the brake system 30, may be regulated by one or more control modules, such as a powertrain control module (PCM) 40 and a chassis control module 42 as shown. In this manner, the PCM 40 may be used to regulate the drive torque produced by the powerplant 12 and transferred through the transmission 14. Similarly, the chassis control module 42 may be used to regulate the brake force generated by the brake system 30. Further, as will be described in more detail below, the PCM 40 and chassis control module 42 may work together to maintain vehicle speed within a desired speed range of a target cruise speed in a cruise mode of the vehicle system 10. In particular, the PCM 40 and chassis control module 42 may work together to inhibit vehicle speed while the vehicle is travelling on a downhill grade.

With continued reference to FIG. 1, the PCM 40 and chassis control module 42 may regulate the components of the vehicle system 10 based on signals they receive from various devices and sensors that may be included with the vehicle system 10. For example, the PCM 40 and chassis control module 42 may receive signals from driver interface devices 44 operated by a driver of the vehicle.

The driver interface devices 44 may include, but are not limited to, such devices as an accelerator pedal 50, a brake pedal 52, and a cruise control switch 54. The accelerator pedal 50 may generate an accelerator pedal signal (not shown) that may be used to determine the desired drive torque. The brake pedal 52 may generate a signal ($BRAKE_{Sw}$) that may be used to determine the desired brake torque. The cruise control switch 54 may generate a cruise switch signal ($CRUISE_{Sw}$) indicating whether the driver has requested the vehicle system 10 be operated in the cruise mode.

The PCM 40 and chassis control module 42 may also receive signals from various sensors included with the powerplant 12 and the brake system 30. Sensors 56 included with the powerplant 12 may be used to sense various operating parameters of the powerplant 12. The sensors 56 may include, but are not limited to, a mass air flow sensor (not shown) of the engine 20 and a battery voltage sensor (not shown) of the power package assembly 28.

Sensors included with the brake system 30 may be used to sense various operating parameters of the brake system 30. The sensors may include, but are not limited to, one or more of a brake fluid pressure sensor 58 and a wheel speed sensor 60. The pressure sensor 58 may sense a working pressure of the brake fluid within the brake system 30. The pressure sensor 58 may generate a pressure signal ($BRAKE_{Ps}$) that may be used to determine the working pressure of the brake fluid. The pressure signal, $BRAKE_{Ps}$, may be output to the chassis control module 42. The wheel speed sensor 60 may measure the rotational speed of the wheels 18. The wheel speed sensor 60 may generate a signal that is communicated to the chassis control module 42 and may be used by the chassis control module 42 to determine a current speed of the vehicle ($V_s$).

While the sensors 56 and sensors 58, 60 are shown in FIG. 1 located at the engine 20 and the brake system 30, respectively, it will be appreciated that the various sensors 56-60 may be located throughout the vehicle system 10 as may be desired. The signals generated by the driver interface devices 44 and the sensors 56-60 may be communicated to one or more of the modules of the vehicle system 10, including the PCM 40 and the chassis control module 42 as shown. Additionally, the PCM 40 and chassis control module 42 may communicate the various signals they receive to each other and other modules of the vehicle system 10.

Based on the signals generated by the driver interface devices 44 and the sensors 56-60, the PCM 40 may regulate the drive torque produced by the powerplant 12 by regulating actuators 62 included with the powerplant 12. For example, the PCM 40 may regulate a throttle valve (not shown) used to vary the amount of air supplied to the engine 20 for combustion. Similarly, the chassis control module 42 may regulate the brake torque generated by the brake system 30 by controlling actuators included with the brake system 30, such as the brake modulator 32 and the brakes 34. The chassis control module 42 may generate a brake control signal ($BRAKE_{Control}$) that is output to the brake modulator 32 for regulating the brake torque generated by the brakes 34 and apportioning the brake torque among the wheels 18.

From the foregoing, it will be appreciated that the PCM 40 and chassis control module 42 may regulate the vehicle system 10 to vary the speed of the vehicle. The PCM 40 and chassis control module 42 may also regulate the vehicle system 10 to maintain current vehicle speed at or near the target cruise speed in the cruise mode as will now be described.

Referring still to FIG. 1, the PCM 40 may include a cruise control module 70 that works together with a brake control module 72 of the chassis control module 42 to maintain vehicle speed within the desired speed range. More specifically, the cruise control module 70 may work together with the brake control module 72 to reduce the vehicle speed to within the desired speed range when the vehicle speed becomes excessive. The vehicle speed may become excessive, for example, when operating the vehicle on a downhill grade.

The cruise control module 70 and the brake control module 72 may also work together with other modules of the vehicle system 10 that regulate operation of the vehicle system 10 to decelerate the vehicle. As one example, the vehicle system 10 may include one or more modules (not shown) for regulating the powerplant 12 in a powertrain braking mode. In the powertrain braking mode, the modules may regulate the transmission 14 to shift into a lower gear, increasing the rotational speed of the powerplant 12, and thereby increasing the negative drive torque produced by the powerplant 12.

Figure 2:
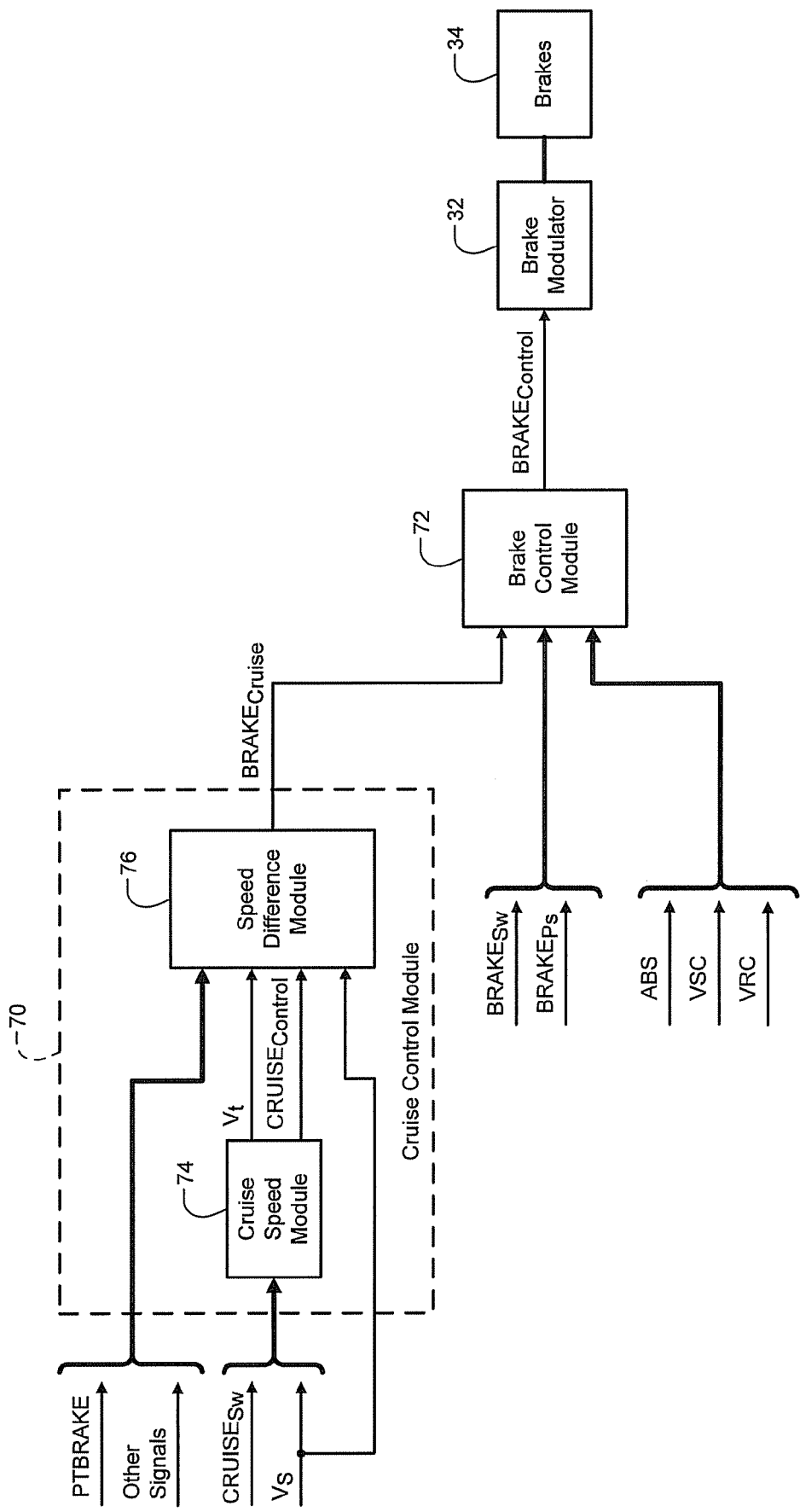
FIG. 2 is a functional block diagram illustrating an exemplary cruise control system according to the principles of the present disclosure.

With particular reference to FIG. 2, the cruise control module 70 may include a cruise speed module 74 and a speed difference module 76. The cruise speed module 74 may receive $CRUISE_{Sw}$ from the cruise control switch 54 and the current vehicle speed ($V_s$). Based on $CRUISE_{Sw}$ and $V_s$, the cruise speed module 74 may determine the target cruise speed ($V_t$) and generate a cruise control signal ($CRUISE_{Control}$) indicating whether the vehicle system 10 is operating in the cruise mode. The cruise speed module 74 may output $V_t$ and $CRUISE_{Control}$ to one or more modules of the PCM 40, including the speed difference module 76.

The speed difference module 76 may receive $V_t$, $V_s$, and $CRUISE_{Control}$ and generate a cruise mode brake signal ($BRAKE_{Cruise}$) that may be output to the brake control module 72 as shown. Additionally, the speed difference module 76 may also generate $BRAKE_{Cruise}$ based on signals generated by other modules included with the vehicle system 10. For example, the other signals may include a PTBRAKE signal indicating whether the vehicle system 10 is operating in a powertrain braking mode. The PTBRAKE signal may also indicate a current negative drive torque produced by the powerplant 12. The PTBRAKE signal may further indicate an available negative drive torque of the powerplant in the future.

The $BRAKE_{Cruise}$ signal may indicate whether cruise mode braking is desired to maintain vehicle speed at or near the target cruise speed, $V_t$. Thus, $BRAKE_{Cruise}$ may be a binary signal indicating whether vehicle braking is desired in a cruise braking mode. Cruise mode braking may be desired when the current vehicle speed, $V_s$, exceeds $V_t$ by a predetermined value ($V_{diff}$). Thus, the speed difference module 76 may generate $BRAKE_{Cruise}$ based on a comparison of $V_s$, $V_t$, and $V_{diff}$. For example, cruise mode braking may be desired when the value of $V_s$ minus $V_t$ is greater than the value of $V_{diff}$. Put another way, cruise mode braking may be desired when the value of $V_s$ is greater than an upper threshold value equal to the value of $V_t$ plus $V_{diff}$.

The speed difference module 76 may also generate $BRAKE_{Cruise}$ to indicate a desired magnitude of cruise mode braking force in the cruise braking mode. Thus, $BRAKE_{Cruise}$ may indicate a value of zero while cruise mode braking is not desired. Additionally, while cruise mode braking is desired, $BRAKE_{Cruise}$ may indicate a particular value not equal to zero that corresponds to the desired magnitude of cruise mode braking force.

The desired magnitude may represent an absolute amount of braking, such as a particular amount of desired braking force or brake torque. Alternatively, the magnitude may be a relative amount, such as a percentage of a predetermined threshold braking force or brake torque. The threshold braking force may be predetermined in a variety of ways. For example, the threshold braking force or torque may be predetermined to minimize driver perception of vehicle braking during the cruise braking mode. Alternatively, the threshold braking force may be predetermined to produce a desired vehicle deceleration rate.

The desired magnitude of cruise mode braking force may be dependent on the current vehicle speed, $V_s$. For example, the magnitude may be proportional to $V_s$. The magnitude may also be proportional to the difference between the current vehicle speed, $V_s$, and the target cruise speed, $V_t$. Additionally, the magnitude may be dependent on the current negative drive torque produced by the powerplant 12. The desired magnitude may also be based on the available negative drive torque of the powerplant 12 in the future.

The speed difference module 76 may determine the desired magnitude of cruise mode braking force in a variety of ways. From the foregoing, it will be appreciated that the speed difference module 76 may determine the desired magnitude of cruise mode braking force based on the value of $V_s$ minus $V_t$. Additionally, the speed difference module 76 may implement a control loop feedback routine to determine the desired magnitude of cruise mode braking force, such as a proportional-integral-derivative (PID) control routine. PID control may be used to determine the magnitude based on $V_t$ and $V_s$. Alternatively, PID control may be based on the values of $V_{diff}$ and the value of $V_s$ minus $V_t$. Control loop feedback may be implemented to improve control of vehicle speed and ensure a smooth response during cruise mode braking.

The brake control module 72 may receive $BRAKE_{Cruise}$ and other signals generated by the vehicle system 10. Based on the signals it receives, the brake control module 72 may generate the $BRAKE_{Control}$ signal to generate a control amount of vehicle braking force. The brake control module 72 may receive signals such as $BRAKE_{Sw}$ and $BRAKE_{Ps}$ generated by the brake system 30. Additionally, the brake control module 72 may receive signals such as, but are not limited to, an anti-lock brake (ABS) signal, a vehicle stability control (VSC) signal, and a vehicle rollover control (VRC) signal. Based on the foregoing signals, the brake control module 72 may generate $BRAKE_{Control}$ to generate the control amount of vehicle braking force.

The control amount of vehicle braking may be equal to a desired brake torque indicated by the driver of the vehicle via the brake pedal 52. Alternatively, in the cruise braking mode, the control amount may less than or equal to the desired magnitude of cruise mode braking force in the cruise braking mode. The control amount of vehicle braking may be less than the desired magnitude of cruise mode braking force when it is desirable to limit vehicle braking for overriding reasons. Slippery or uneven roads may provide an overriding reason to limit the control amount of vehicle braking force generated by the brakes 34. The available negative drive torque in the future may provide another overriding reason to limit the control amount of vehicle braking force.

The brake control module 72 may generate the $BRAKE_{Control}$ signal to apportion the control amount of vehicle braking force among the wheels 18 via the brakes 34. Put another way, the brake control module 72 may generate the $BRAKE_{Control}$ signal to apportion the brake torque generated by each of the wheels 18. For example, the brake control module 72 may limit the brake torque generated by one or more of the wheels 18 to avoid wheel lock-up under slippery or uneven road conditions or to inhibit a loss of vehicle control. Thus, it will be appreciated that the brake control module 72 may generate the $BRAKE_{Control}$ signal to generate a fraction of the desired amount of vehicle braking force that may be indicated by the signals it receives, including $BRAKE_{Cruise}$.

From the foregoing, it will be appreciated that vehicle system 10 may regulate the brakes 34 in the cruise mode to maintain vehicle speed within the desired speed range of the target cruise speed. The vehicle system 10 may regulate the brakes 34 based on the difference between the current vehicle speed and the target cruise speed. In this manner, the vehicle system 10 may be used to inhibit vehicle speed while the vehicle is travelling on a downhill grade. Additionally, it will be appreciated that the vehicle system 10 may regulate the magnitude of braking force generated by the brakes 34 to inhibit vehicle speed.

Figure 3:
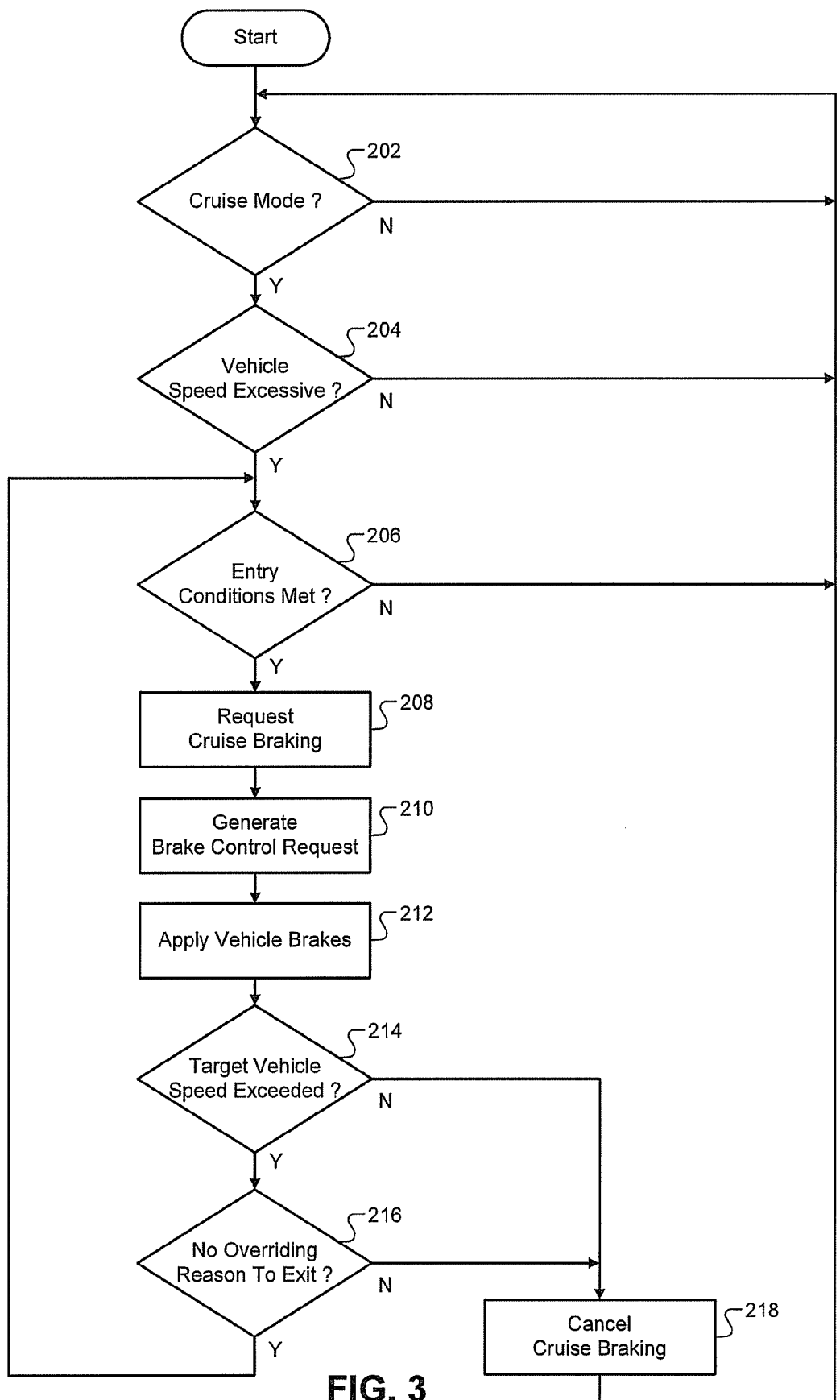
FIG. 3 is a flow diagram illustrating exemplary steps for a cruise control method according to the principles of the present disclosure.

With particular reference to FIG. 3, an exemplary control method 200 for implementing cruise mode braking is shown. For simplicity, the control method 200 will be described with reference to the vehicle system 10 previously described herein. However, it will be appreciated that the control method 200 may be implemented with other vehicle systems. The control method 200 may be implemented using the various modules previously described herein, such as the PCM 40 and the chassis control module 42. The control method 200 may be implemented to supplement other control methods for regulating vehicle speed in various modes of operation, such as the cruise mode and the powertrain braking mode previously discussed herein.

The control method 200 begins in step 202 where control determines whether the vehicle system 10 is operating in the cruise mode. If the vehicle system 10 is operating in the cruise mode, control proceeds in step 204, otherwise control loops back as shown.

In step 204, control determines whether the current vehicle speed is excessive. In general, control will determine that the current vehicle speed is excessive when the current vehicle speed is above an upper threshold of a desired speed range (i.e., not within the desired speed range) in the cruise mode. Thus, control may determine that the current vehicle speed is excessive by comparing $V_s$, $V_t$, and $V_{diff}$. For example, control may determine that the current vehicle speed is excessive if the value of $V_s$ minus $V_t$ is greater than $V_{diff}$ as previously discussed herein. If the current vehicle speed is excessive, control proceeds in step 206, otherwise control loops back and continues in step 202 as previously described.

In step 206, control determines whether entry conditions are met for cruise mode braking in a cruise braking mode. In general, the entry conditions will be met for the cruise braking mode when there are no overriding reasons to inhibit cruise mode braking. Overriding reasons to inhibit cruise mode braking may exist when cruise mode braking may not be desired for reasons such as vehicle stability and/or control. Additionally, overriding reasons may exist when other control modules operating the vehicle system 10 to generate negative drive torque may be further employed to reduce vehicle speed. Put another way, an overriding reason may exist when additional negative drive torque is available to reduce vehicle speed. For example, an overriding reason may exist when the vehicle system 10 is being operated in a powertrain braking mode and the transmission 14 may be shifted into a lower gear to produce additional negative drive torque and thereby reduce vehicle speed. The entry conditions may be met when the transmission 14 may no longer be shifted into a lower gear without over speeding the engine 20.

If the entry conditions are satisfied, control proceeds in step 208 where control generates a request for cruise mode braking in a cruise braking mode. The request for cruise mode braking may be a general request indicating that cruise mode braking is desired. Alternatively, the request for cruise mode braking may indicate a desired magnitude of cruise mode braking force. As previously discussed herein, the magnitude may be based on a current vehicle speed and a target vehicle speed. The magnitude may also be based on one or more of a threshold braking force, a negative drive torque, and a desired vehicle deceleration rate. In step 208, control may generate a signal, such as $BRAKE_{Cruise}$, indicating the request for cruise mode braking. From step 208, control proceeds in step 210.

In step 210, control generates a brake control signal requesting a control amount of braking force. More specifically, control generates the brake control signal to regulate the brakes (e.g., brakes 34) and thereby generate the control amount of braking force. Generally, the control amount of braking force will correspond to the magnitude of desired cruise mode braking force. Thus, the brake control request may be based on the magnitude of desired cruise mode braking force indicated by the request for cruise mode braking generated in step 208.

Alternatively, the control amount of vehicle braking force may be less than the magnitude of desired cruise mode braking force. For example, the control amount may be limited when slippery or uneven roads exist. The control amount may also be limited based on the operating conditions of the vehicle system 10. For example, the control amount may be limited based on the target cruise speed. Additionally, the control amount may be limited while the vehicle is travelling in a turn.

From step 210, control proceeds in step 212 where control selectively applies the brakes to generate the control amount of vehicle braking force. Next, in step 214, control determines whether the current vehicle speed exceeds the target cruise speed. Thus, in step 214, control may compare $V_s$ and $V_t$. If the current vehicle speed exceeds the target cruise speed (e.g., $V_s > V_t$), then control proceeds in step 216, otherwise control proceeds in step 218.

In step 216, control determines whether there is an overriding reason to discontinue cruise mode braking. An overriding reason to discontinue may exist when the driver has indicated that the vehicle system 10 should no longer be operated in the cruise mode. Additionally, an overriding reason may exist when one or more of the entry conditions is no longer being met. An overriding reason to discontinue may also exist when failing to do so may result in overheating of the brakes or other components of the brake system. If there are no overriding reasons to discontinue cruise mode braking, control loops back and continues in step 206 as previously described. If there is an overriding reason to exit, control proceeds in step 218.

In step 218, control cancels the request for cruise mode braking, thereby discontinuing regulation of the brakes in the cruise braking mode. From step 218, control loops back and proceeds in step 202 as previously described.

From the foregoing, it will be appreciated that the control method 200 may regulate the brakes in the cruise mode based on a comparison of the current vehicle speed and the target cruise speed. The control method 200 may regulate the brakes in the cruise mode to inhibit vehicle speed and thereby maintain vehicle speed within the desired speed range of the target cruise speed. Thus, it will also be appreciated that the control method 200 may inhibit vehicle speed in the cruise mode while operating on a downhill grade by regulating the brakes.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A cruise control system comprising:
   a speed difference module that compares a current vehicle speed and a target cruise speed; and
   a brake control module that selectively actuates a brake when said current vehicle speed is greater than said target cruise speed by a predetermined speed difference, wherein said brake control module selectively actuates said brake based on a negative drive torque of a powerplant.

2. The control system of claim 1 wherein said brake control module actuates said brake while said current vehicle speed is greater than said target cruise speed.

3. A cruise control system comprising:
   a speed difference module that determines a desired braking force based on a comparison of a current vehicle speed and a target cruise speed; and
   a brake control module that selectively actuates a brake to generate an actual braking force less than or equal to said desired braking force when said current vehicle speed is greater than said target cruise speed by a predetermined speed difference.

4. A cruise control system comprising:
   a speed difference module that determines a desired braking force based on a comparison of a current vehicle speed and a target cruise speed; and
   a brake control module that selectively actuates a brake to generate an actual braking force less than or equal to said desired braking force when said current vehicle speed is greater than said target cruise speed by a predetermined speed difference, wherein said speed difference module determines said desired braking force based on a negative drive torque of a powerplant.

5. The control system of claim 4 wherein said speed difference module determines said desired braking force using a control loop feedback routine.

6. A cruise control method comprising:
   comparing a current vehicle speed and a target cruise speed; and
   selectively actuating a brake when said current vehicle speed is greater than said target cruise speed by a predetermined speed difference, wherein said selectively actuating said brake further includes selectively actuating said brake based on a negative drive torque of a powerplant.

7. The method of claim 6 wherein said selectively actuating said brake includes actuating said brake while said current vehicle speed is greater than said target cruise speed.

8. A cruise control method comprising:
   comparing a current vehicle speed and a target cruise speed;
   selectively actuating a brake when said current vehicle speed is greater than said target cruise speed by a predetermined speed difference; and
   determining a desired braking force based on said comparing said current vehicle speed and said target cruise speed, wherein said selectively actuating said brake further includes actuating said brake to generate an actual braking force less than or equal to said desired braking force.

9. The method of claim 8 wherein said determining said desired braking force further includes determining said desired braking force based on a negative drive torque of a powerplant.

10. The method of claim 8 wherein said determining said desired braking force includes determining said desired braking force using a control loop feedback routine.

* * * * *